United States Patent [19]

Sutton et al.

[11] Patent Number: 5,064,582

[45] Date of Patent: Nov. 12, 1991

[54] PROCESS AND APPARATUS FOR RECYCLING AQUEOUS FLUID ABSORBENTS FINES

[75] Inventors: Tod A. Sutton; Karl V. Jacob; Timothy Lim; Steven P. Sandor, all of Midland, Mich.

[73] Assignee: The Dow Chemical Company, Midland, Mich.

[21] Appl. No.: 407,840

[22] Filed: Sep. 15, 1989

[51] Int. Cl.$^5$ .............................................. C08J 11/06
[52] U.S. Cl. ..................................... 264/37; 264/118; 264/141; 521/40.5; 521/45; 521/45.5; 528/499; 528/502
[58] Field of Search .......................... 264/37, 118, 141; 528/499, 502; 521/45, 40.5, 45.5

[56] References Cited

U.S. PATENT DOCUMENTS 4,950,692  8/1990  Lewis et al. ............................ 521/45

Primary Examiner—Mary Lynn Thiesen

[57] ABSTRACT

A process for recycling and reblending dry, difficult to hydrate polymer fines into a water-swellable fluid absorbent polymer gel is disclosed. The process requires feeding the dry polymer fines into a first mixing zone where they are subjected to spraying with water that at least partially hydrates the fines and mixing, substantially simultaneously with the water contact, at high shear such at the fines are substantial completely hydrated without agglomeration. The hydrated fines are then transported from the first zone into a second mixing zone where blending of the hydrated fines with fresh polymer gel occurs at medium shear such that a substantially uniformly blended product results. The resulting process successfully re-introduces fines into the main product stream wherein the resulting product has high aqueous fluid absorbent capacity and good particulate mechanical integrity.

11 Claims, 2 Drawing Sheets

PROCESS AND APPARATUS FOR RECYCLING AQUEOUS FLUID ABSORBENTS FINES

BACKGROUND OF THE INVENTION

The invention relates to recycling dry, difficult to hydrate, fines into a main product stream. More particularly, the invention relates to reprocessing fines generated in the production of fluid absorbent polymers and copolymers.

Water-swellable polymers and copolymers are well known for their use as absorbents for aqueous fluids in diapers, sanitary products and the like. Certain of these polymers, such as those prepared from monomers of acrylic acid or methacrylic acid or their respective alkali metal or ammonium salts, and lightly crosslinked with a crosslinking monomer having at least two polymerizable double bonds, exhibit exceptionally high capacity for adsorbing liquids and are further characterized as having good physical integrity in processing and use.

These polymers/copolymers are typically employed in a particulate form that promotes contact with the fluid to be adsorbed. Good physical integrity of the particulate is a key desirable quality because the polymer/copolymer fines often lack the ability to absorb fluids that the desired particulate product possesses. In addition, the presence of fines in some absorbent products may significantly adversely affect the overall absorbing performance of the product.

In the production of acrylic acid-based copolymers, a significant portion of fines material, that is, less than 100 mesh (149 micrometers), is typically generated from the process of manufacturing the absorbent product. These processes generally include drying the polymer or copolymer gel, followed by breaking up and grinding to a final acceptable particle size range. In the course of the process, 8-11 percent by weight of the final product may be fines.

Initially, users employed the entire dry product, including fines, in their absorbent products. It was soon discovered, however, that the inclusion of fines resulted in lower product performance. The difficulty occurs when the fine particles are contacted with an aqueous fluid. The contact results in a "gel blocking" phenomenon. Upon hydration of a tightly packed mass of fines, only the outside layer is wetted because the fines form such a dense polymeric network that neither capillary action nor diffusion will permit penetration of the fluid into uniform contact with the interior particles. The result is a substantially reduced overall capacity of the absorbent polymer to absorb and hold aqueous fluids.

An initial solution to the fines problem was simply to screen the fines from the product. The resulting fines were stored as off-specification product. Attempts at directly recycling the fines into the process were heretofor unsuccessful even where wetting of the dry fines was attempted. Early trials resulted in products that would not dry or only dry at uneconomical rates. The recycled fines also failed in producing a particulate that would not disintegrate in processing subsequent to drying (such as sizing, pneumatic conveying or screening, for example) necessary for forming commercial products.

Thus, it would be desirable to provide a process that recycles fines into a main product stream of polymer/copolymer such that the finished product absorbent capacity and particulate integrity are equivalent to the material normally produced of a desired particle size. Such a process should not add significantly to drying time.

SUMMARY OF THE INVENTION

The invention is a process for reblending dry, difficult to hydrate, fines into a viscous material such as polymer or copolymer of a water-swellable gel formed by polymerizing an $\alpha,\beta$-ethylenically unsaturated monomer with crosslinking agents. The process requires feeding the dry fines, on the order of less than 100 mesh (149 micrometers) into a first mixing zone. Water is sprayed into the mixing zone into contact with the fines such that the fines become partially hydrated. The process further requires mixing, substantially simultaneously with said spraying in said mixing zone, said fines with the water at high shear such that the fines are substantially completely hydrated without substantial agglomeration and transported from the mixing zone. The process continues with blending said hydrated fines with said viscous material in a second mixing zone wherein the fines and viscous material are kneaded together at medium shear such that a substantially uniformly blended product results. The viscous material of the invention is preferably a water-swellable fluid absorbent gel, that is the neutralized copolymer lightly crosslinked principally of acrylic acid, metacrylic acid, crotonic acid or isocrotonic acid.

The ratio of water to fines employed at feeding and spraying is about 10:90 to 90:10. A preferred ratio of water to fines is about 2:1. Blending of the hydrated fines with fresh viscous gel material is at weight ratios of about 20:80 to 50:50.

The invention also includes an apparatus for reblending the dry, difficult to hydrate fines into a water-swellable viscous material. The apparatus comprises a mixing chamber and a feeder for introducing said fines into said chamber. A plurality of spraying nozzles are located about the mixing chamber for introducing water into contact with the fines, whereby the fines become at least partially hydrated. A series of impellers, adjacent to said spraying nozzles, is mounted upon a shaft for rotation within the mixing chamber wherein the fines are subjected to high shear mixing, substantially simultaneously with contact with the water, such that said fines are substantially completely hydrated without agglomeration and transported from the mixing chamber. The apparatus also includes an extruder for receiving the hydrated fines from the mixing chamber and fresh water-swellable viscous material. The extruder imparts a kneading and mixing action, at medium shear, to said fines and viscous material such that a uniformly blended product results.

BRIEF DESCRIPTIONS OF THE DRAWINGS

DETAILED DESCRIPTION OF THE INVENTION

The water-swellable or lightly crosslinked hydrophilic polymers or copolymers that are of particular interest in the process of the present invention are any of those capable of adsorbing large quantities of aqueous fluids. Examples of such polymers and methods for making them are found in U.S. Pat. Nos. 3,997,484; 3,926,891; 3,935,099; 4,090,013; 4,190,562, the relevant parts of which are herein incorporated by reference. In general, such polymers are prepared from water-soluble $\alpha,\beta$-ethylenically unsaturated monomers such as mono and polycarboxylic acids and acrylamide and its derivatives. Examples of suitable mono-carboxylic acids include acrylic acid, methacrylic acid, crotonic acid and isocrotonic acid and their alkali metal and ammonium salts. Suitable polycarboxylic acids include maleic acid, fumaric acid and iticonic acid. Suitable acrylamide derivatives include methylacrylamide and N,N-dimethylacrylamide. The preferred monomers include acrylic acid and methacrylic acid and their respective alkali metal or ammonium salts.

Organic compounds having two or more ethylenic groups copolymerizable with the water-soluble monomers can be used as crosslinking monomers. Exemplary crosslinking monomers include diacrylate or dimethacrylate esters of ethylene glycol, diethylene glycol, triethylene glycol, polyethylene glycol, 1,4-butane diol and the like as noted in European Patent Application Publication No. 0 321 385. The degree of crosslinking is selected such that water absorption capacity of the polymer is not reduced nor so low that the absorbent becomes sticky on contact with fluid and exhibits a low initial absorption rate.

The water-soluble monomer and crosslinking monomer are polymerized in the presence of a polymerization initiator in any known manner such that a gel-like reaction product results. The gel polymer is dried, preferably by hot air at about 50° to 200° C. such that the moisture content of the hydrated polymer gel is between about 4 and 40 percent based on the total weight of the absorbent polymer. The dried polymer is then comminuted into a particulate product having a desired size particulates. Again, reference is made to EPO 321 385, the relevant parts of which are incorporated by reference.

Figure 1:
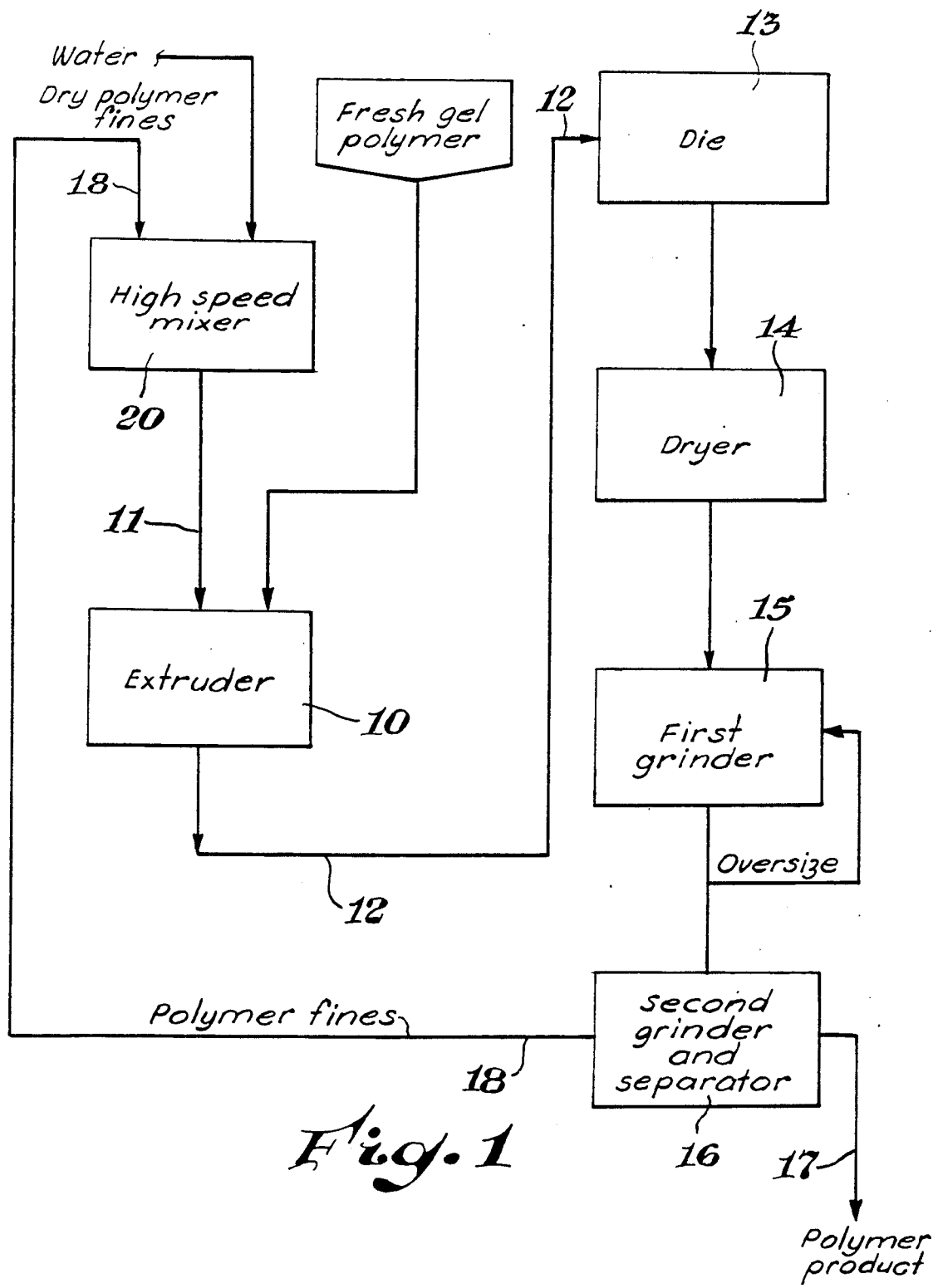
FIG. 1 is a schematic block diagram showing the overall process of the invention of recycling fines and reblending them with fresh gel product.

Referring to FIG. 1, the process of the invention requires introduction of fresh viscous swellable polymer gel, in a hydrated state from its manufacturing proces, into an extruder 10 wherein it is subjected to medium shear kneading, and mulling action for blending with the hydrated fine stream 11 (which will be described in more detail below). The extruder 10 extrudes the blended polymer gel mass 12 through a die 13 which forms the gel into shapes having sufficient surface area for drying.

The polymer gel is then introduced into a dryer 14 and dried, typically with hot air at a temperature of about 50°-200° C., optionally under reduced pressure, until the moisture content of the gel is below about 40 percent, preferably below about 4 percent, based on the total weight of absorbent polymer. Although not shown, the drying process may be accomplished in two or more steps with intermediate comminution steps.

The dried product is introduced into a first grinder 15 for partially sizing into a particulate form and size selected for the intended product application. Finally, the particulate polymer product enters a second grinder and separator 16 that produces a final polymer particulate product 17 and a fines stream 18 that is typically less than 100 mesh (149 micrometers). As noted above, the fines material may constitute about 8 to 11 percent by weight, based on the total absorbent polymer flowing through the process.

The process of the invention centers upon recycling the dry polymer fines 18 into a main flow of fresh hydrated polymer gel produced by the gel manufacturing process. The process of the invention requires high speed mixing of the dry fines 18 in a high speed mixer 20 with water until the fines are substantially hydrated. The hydrated fines 11 are then introduced, along with the fresh gel product from gel manufacturing, into the extruder 10, for blending as previously described.

Figure 2:
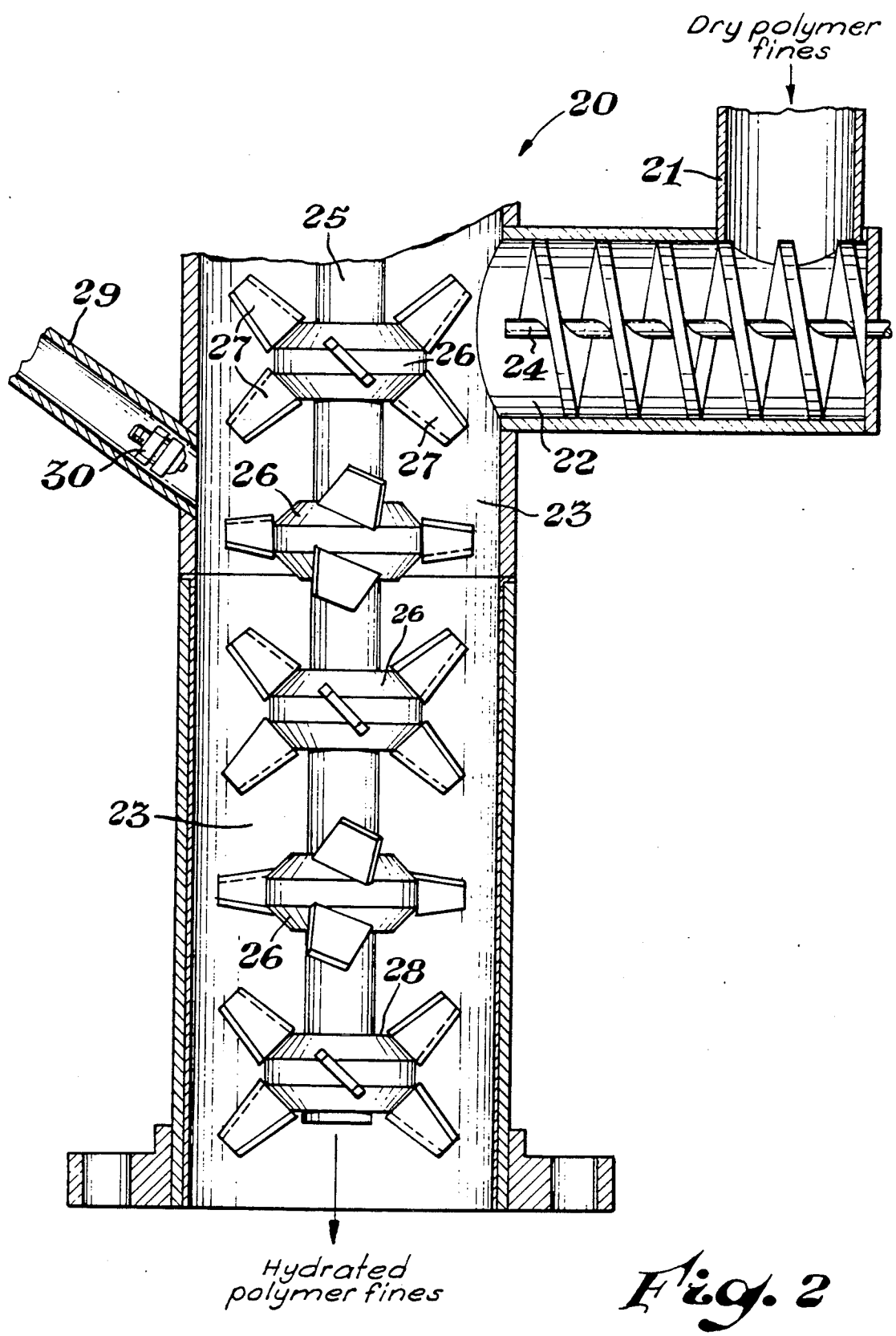
FIG. 2 is a schematic elevational view of an apparatus for hydrating fines prior to reblending with the fresh gel product.

Referring to FIG. 2, the fines mixer 20 is shown in schematic detail. The mixer includes a feeder 21 for receiving the dry fines 18 and introducing said fines through a discharge port 22, at a controlled rate, into a mixing chamber 23. The fines mixer preferably includes twin screws 24 (only one is shown) for transporting the fines but may be any other type of powder feeder. The mixing chamber 23 is preferably of a cylindrical shape and is fitted with a shaft 25 for supporting, at high speed rotation, a series of impellers 26.

Each impeller 26 includes mixing paddle elements 27 designed and arranged to impart high shear mixing to the fines material entering from the feeder discharge port 22. The lower impellers 28 may include additional paddle elements designed and positioned to provide an additional forwarding or transporting action on the polymer mass to prevent plugging of the mixing chamber. In a preferred mixer, there are six impellers, the lower three of which include the additional forwarding elements. The impellers are designed to rotate at about 1,000 to 1,800 revolutions per minute.

The mixing chamber includes a plurality of water feed ports 29. Each water port includes a recessed nozzle 30 for feeding air-spray mixture into the mixing chamber 23. In a preferred mixer there are six water feed ports 29 spaced equally around the circumference of the mixing chamber located approximately at the second impeller from the top.

In operation, the dry fines 18 are introduced by means of the feeder 21 into the mixing chamber 23, at a controlled rate, where they come into contact with the rapidly rotating mixer impellers 26 and then contact the water-air mist introduced through the spray nozzles 30. The impellers and water nozzles may be arranged such that the first impeller helps keep the dry fines entry port clear and free of water with the water mist being introduced below the first impeller. The combination of fine water-air mist and rotating impellers provides an environment where good particle/water mixing takes place. A key requirement of the mist-mixing environment is to provide good separation between individual fines particles so that each has access to water and the particles do not agglomerate and become gel blocked and thus prevented from substantially complete hydration. Thus, the fines particles when they first contact the air/water spray become at least partially hydrated. Substantially simultaneously with the initial hydration, the particles are subjected to high shear mixing and become as they progress from one impeller to the next substantially completely hydrated without agglomeration. The fines are then transported from the mixing zone. The ratio of water to fines is 10:90 to 90:10 and, preferably, is about 2:1.

The hydrated fines 11 depart the high speed mixer and are introduced into the extruder where they are mixed with fresh polymer from the gel manufacturing plant. The weight ratio of fresh gel to rehydrated fines ranges between 50:50 to 80:20 with the ratio typically closer to the 80:20 range. The effect of the extruder is much like a dough mixer. Typically, an open flighted screw combined with a series of stationary plates provide a kneading and mixing action for blending the two streams. The blended product of hydrated fines and fresh gel then proceeds to drying and further processing stages as described hereinbefore.

The water introduced into the mixing chamber at the air-water nozzles 30 is preferably heated to a temperature of about 20°-65° C. or higher. It is important that the water be heated because the hydration takes place more slowly in cold water and mixing of cold, hydrated fines with the warm fresh gel results in a stream that is 2°-20° cooler than the fresh gel alone. This colder gel has substantially different rheological properties and may not dry or process as well as the preferred product.

What is claimed is:

1. A process for reblending dry, difficult to hydrate, polymer fines into a water-swellable viscous polymer material, comprising:
   feeding dry fines into a first mixing zone:
   spraying water into said mixing zone into contact with said fines such that said fines are partially hydrated:
   mixing, substantially simultaneously with said spraying, in said mixing zone said fines and water at high shear such that said fines are substantially hydrated, without substantial agglomeration or gelation, and transported from said first mixing zone: and
   blending said hydrated fines with said viscous material in a second mixing zone wherein said fines and viscous material are kneaded together at medium shear such that a substantially uniformly blended product results.

2. The process of claim 1 wherein said viscous polymer material is a water swellable, aqueous fluid absorbent polymer or copolymer gel.

3. The process of claim 2 produced from monomers of acrylic acid, methacrylic acid, crotonic acid, isocrotonic acid and their alkali metal and ammonium salts.

4. The process of claim 3 wherein said polymer fines are less that 100 mesh (149 micrometers) in size.

5. The process of claim 1 wherein, at feeding and spraying, the weight ratio of water to polymer fines is about 10:90 to 90:10.

6. The process of claim 5 wherein said ratio of water to polymer fines is about 2:1.

7. The process of claim 1 wherein the blending of polymer fines with viscous material is at a ratio of 20:80 to 50:50.

8. The process of claim 1 wherein said mixing at high shear comprises contacting said partially hydrated polymer fines with a series of impellers that are shaft mounted in said mixing zone and rotate at 1,000-1,800 rpm.

9. The process of claim 1 wherein said spraying water is heated to at least about 20° C.

10. The process of claim 9 where said spraying water is heated to at least about 65° C.

11. A process for making a particulate aqueous fluid absorbent polymer of high capacity and mechanical integrity, comprising:
    forming a water-swellable copolymer gel of an $\alpha,\beta$-ethylenically unsaturated carboxylic acid monomer and a crosslinking monomer having at least two polymerizable double bonds, said gel at least partially neutralized:
    blending said gel at medium shear:
    extruding said gel to a form having a surface area suitable for drying:
    drying said gel to a solid form:
    grinding said dried solid such that a product absorbent polymer of selected particulate size is produced;
    recycling oversize particulate for further attriting:
    feeding polymer fines, less than said selected particulate size, into a mixing zone:
    spraying water into said mixing zone into contact with said fines such that said fines are partially hydrated;
    mixing, substantially simultaneously with said spraying, in said mixing zone said fines and water at high shear such that said fines are substantially completely hydrated without agglomeration and transported from said zone:
    recycling said hydrated fines into said blending step with said copolymer gel wherein said fines and gel are kneaded together at medium shear such that a substantially uniformly blended product results.

* * * * *